/ United States Patent (12)
Artner et al.

(10) Patent No.: US 6,439,650 B2
(45) Date of Patent: Aug. 27, 2002

(54) TRANSVERSE-MEMBER MODULE FOR A FRONT OR REAR SIDE END REGION OF A MOTOR VEHICLE AND METHOD OF MAKING SAME

(75) Inventors: Bernd Artner, Renningen; Albrecht Krüger-Eppstein, Stuttgart, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/731,902

(22) Filed: Dec. 8, 2000

(30) Foreign Application Priority Data

Dec. 8, 1999 (DE) .......................................... 199 58 996

(51) Int. Cl.$^7$ .......................... B60R 19/24; B60R 19/04
(52) U.S. Cl. ........................ 296/189; 293/102; 293/117; 293/120; 296/203.02
(58) Field of Search ................................ 296/189, 204, 296/203.01, 203.02; 293/149, 120, 102, 117, 132, 133

(56) References Cited

U.S. PATENT DOCUMENTS

| | | | | |
|---|---|---|---|---|
| 4,684,151 A | * | 8/1987 | Drewek ....................... 296/189 |
| 4,762,352 A | * | 8/1988 | Enomoto .................... 293/120 |
| 5,154,462 A | * | 10/1992 | Carpenter ................... 293/120 |
| 5,314,229 A | * | 5/1994 | Matuzawa et al. .......... 296/189 |
| 5,785,367 A | | 7/1998 | Baumann et al. |
| 5,853,195 A | * | 12/1998 | Le et al. ..................... 280/784 |
| 5,876,077 A | * | 3/1999 | Miskech et al. ............. 293/132 |
| 5,984,403 A | * | 11/1999 | Kuroda ....................... 296/189 |
| 6,059,331 A | * | 5/2000 | Mori ........................... 293/133 |
| 6,152,521 A | * | 11/2000 | Hayashi et al. ............. 296/188 |
| 6,209,934 B1 | * | 4/2001 | Sakuma et al. ............. 293/120 |

FOREIGN PATENT DOCUMENTS

| | | | |
|---|---|---|---|
| DE | 195 11 868 | 10/1996 | |
| JP | 406270749 A | * 9/1994 | ................. 293/149 |

* cited by examiner

Primary Examiner—Stephen T. Gordon
Assistant Examiner—G Blankenship
(74) Attorney, Agent, or Firm—Crowell & Moring LLP

(57) ABSTRACT

A transverse-member module for a front or rear end of a motor vehicle has a box-shaped flexible member from which protrude two deformation units which are spaced apart and parallel to each other and are intended for connection to a respective longitudinal member of a body-supporting structure of the motor vehicle. The flexible member is formed by two vertical profiles arranged spaced apart and parallel one behind the other in a longitudinal direction of the vehicle, and by at least two horizontal profiles which extend between the vertical profiles and are arranged spaced apart and parallel one above another in the vertical direction of the vehicle, the horizontal profiles being of structurally identical design.

31 Claims, 1 Drawing Sheet

TRANSVERSE-MEMBER MODULE FOR A FRONT OR REAR SIDE END REGION OF A MOTOR VEHICLE AND METHOD OF MAKING SAME

BACKGROUND AND SUMMARY OF THE INVENTION

This application claims the priority of German application 199 58 996.8, filed Dec. 8, 1999, the disclosure of which is expressly incorporated by reference herein.

The invention relates to a transverse-member module for a front- or rear-side end region of a motor vehicle, having a box-shaped flexible member from which protrude two deformation units which are spaced apart parallel to each other and are intended for connection to a respective longitudinal member of a body-supporting structure of the motor vehicle.

A transverse-member module of this type is disclosed in German Patent Document DE 195 11 868 A1 (corresponding U.S. Pat. No. 5,785,367). The transverse-member module has a flexible member which runs in the transverse direction of the vehicle and is of box-shaped design by the joining together of two half-shells. The flexible member can be secured with the aid of deformation units to two longitudinal members of the body-supporting structure, the deformation units protruding at right angles from the flexible member and, when the transverse-member module is fitted, being connected in alignment with the longitudinal members in the longitudinal direction of the vehicle. The deformation units are designed as sheet-metal boxes which are more resistant to deformation than the flexible members.

An object of the invention is to provide a transverse-member module of the type mentioned above which has a simplified structure and ensures cost-effective production.

This object is achieved in that the flexible member is formed by two vertical profiles arranged spaced apart and parallel one behind the other in the longitudinal direction of the vehicle, and by at least two horizontal profiles which extend between the vertical profiles and are arranged spaced apart and parallel one above another in the vertical direction of the vehicle, the horizontal profiles being of structurally identical design. The vertical profiles and the horizontal profiles therefore produce a stable box profile for the flexible member, the profiles, when produced from metal sheet, preferably being welded. However, the vertical and horizontal profiles may also be connected to one another with the aid of fastening elements in the form of rivets, screws or the like according to other contemplated embodiments of the invention. The structurally identical design of the horizontal profiles results in a simple and cost-effective structure for the flexible member. In addition to the two necessary horizontal profiles which contribute to the box shape of the flexible member, one or more further horizontal profiles may also be arranged between the vertical profiles, thereby resulting in a further increase in the resistance to bending of the flexible member. The selection of the number of horizontal profiles to be used is undertaken as a function of the loading demands made in each case on the transverse-member module.

In one refinement of the invention, each horizontal profile has a U-shaped profile, the two U limbs each forming bearing flanges for the plane connection to the vertical profiles. This ensures a particularly stable connection of the horizontal profiles to the vertical profiles.

In a further refinement of the invention, the two vertical profiles are of structurally identical design. This results in a further reduction in the outlay on production for the transverse-member module, since both the horizontal profiles and the vertical profiles are of structurally identical design in each case.

In a further refinement of the invention, a profiled strip provided with sockets for add-on parts is provided in the region of a lower edge of the vertical profile which is at the rear-based on a normal direction of travel. As a result, the vertical profile at the rear side has an additional function by also serving as a support for add-on parts.

In a further refinement of the invention, the profiled strip is designed as an integral continuation of the vertical profile. A structure for the transverse-member module is thereby obtained which is further simplified.

In a further refinement of the invention, the deformation units are designed as energy-absorbing sheet-metal structures which are connected rigidly to the flexible member. As a result, the transverse-member module is designed as a compact sheet-metal constructional unit which can be joined together entirely beforehand and can be connected to the longitudinal members as a finished constructional unit.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
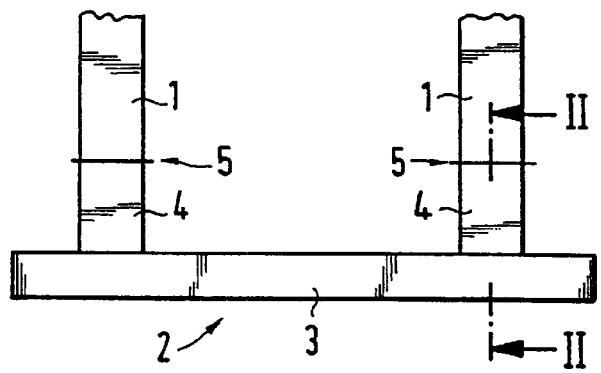
FIG. 1 is a schematic plan view of a front- or rear-side end region of a motor vehicle, which is provided with one embodiment of a transverse-member module according to the invention.

A motor vehicle has a body-supporting structure which is provided in a front-end region with two longitudinal members 1 which protrude parallel to each other in the longitudinal direction of the vehicle. A transverse-member module in the form of a front module 2 is connected via corresponding holding brackets 5 to the front ends of the longitudinal members 1, it being possible for the connection to be of releasable or non-releasable design. In the same manner, a corresponding transverse-member module can be fitted to longitudinal members of a rear region of a motor vehicle, which longitudinal members protrude to the rear in the longitudinal direction of the vehicle, and so the following designs for the transverse-member module 2 designed as a front module apply in an identical manner to a corresponding transverse-member module at the rear end.

The front module 2 has a flexible member 3 which runs in the transverse direction of the vehicle and is designed, in a manner described in greater detail below, as a sheet-metal structure. Protruding at right angles and parallel to each other from the flexible member 3, and aligned in each case with the left or right longitudinal member 1, are two deformation units 4 which are designed as crash boxes and whose end regions which face the front ends of the longitudinal members 1 are assigned bracket sections 5a which can be connected to the holding brackets 5 of the longitudinal members 1. Each deformation unit 4 has an upper boom and a lower boom which are produced from metal sheet and are provided with deformation beads directed inwards in each case. In addition, the deformation units 4 may also be provided with lateral sheet-metal booms (not illustrated) which likewise extend between the flexible member 3 and the holding brackets 5. The illustrated upper boom of each deformation unit 4 is secured by a connecting flange 12 on an upper side of the flexible member 3—preferably by welding. The lower boom of each deformation unit 4 is secured—likewise preferably by welding—to a rear side of the flexible member 3 by a connecting flange 11 angled perpendicularly downwards.

Figure 2:
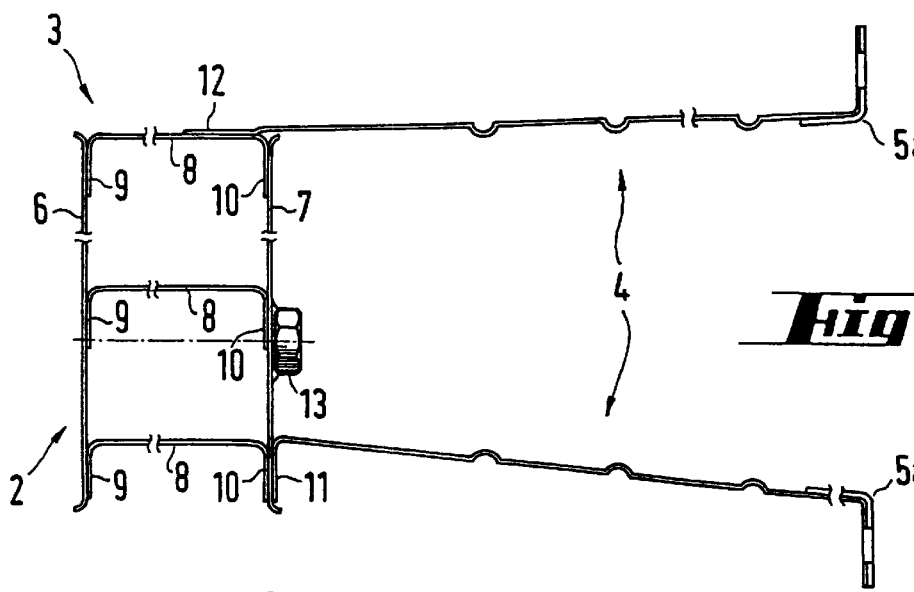
FIG. 2 shows a longitudinal section through the transverse-member module of FIG. 1 along the section line II—II in FIG. 1.

The flexible member 3 has, according to FIG. 2, a front—as seen in the normal direction of travel—profiled boom 6, which runs in the transverse direction of the vehicle and is orientated vertically and serves as a vertical profile, and also a rear profiled boom 7 constituting the rear side of the flexible member 3 with respect to the longitudinal members 1 and serving as a vertical profile. The rear profiled boom 7 is orientated at a distance from and parallel to the front profiled boom 6. The two profiled booms 6, 7 are of structurally identical design and have, in the region of their upper edge and in the region of their lower edge, webs which are continuous over the length thereof, are in each case curved outwards and increase the stability of the profiled booms 6, 7, which are otherwise of planar design. The two profiled booms 6, 7 are produced from metal sheet.

The flexible member 3 also has a horizontal profile 8 serving as an upper boom, and a further horizontal profile 8 serving as a lower boom, the two horizontal profiles 8 being of structurally identical design. The two horizontal profiles 8 have a U-shaped profile, one U limb 9, which faces the front profiled boom 6, being connected to the profiled boom 6 and a rear U limb 10 being connected to the rear profiled boom 7. The horizontal profiles 8, which have a U-shaped profile, are arranged between the two profiled booms 6, 7 in such a manner that the U limbs 9, 10 each protrude downwards parallel to each other—as seen in the vertical direction of the vehicle. As a result, an upper side of the upper horizontal profile 8 ends approximately flush with the upper edges of the profiled booms 6, 7. The connecting flange 12 of the upper boom of the deformation unit 4 is fitted onto this upper side. The lower horizontal profile 8 is inserted between the two profiled booms 6, 7—as seen in the vertical direction of the vehicle—in such a manner that the downwardly protruding U limbs 9, 10 end approximately in the region of shoulders of the outwardly curved webs of the profiled booms 6, 7.

In order to reinforce the hollow chamber formed by the profiled booms 6, 7 and the upper and lower horizontal profiles 8, a further horizontal profile 8 of structurally identical design is inserted halfway between the two horizontal profiles 8 and its U limbs 9, 10 likewise protrude downwards parallel to the profiled booms 6, 7 and are connected flat—preferably by welding—to the respective insides of the profiled booms 6, 7. In other exemplary embodiments of the invention, depending on the height of the particular flexible member, additional horizontal profiles of structurally identical design may be inserted in the interior of the hollow chamber formed by the profiled booms and the upper and lower horizontal profiles. In all of the horizontal profiles 8, the connection to the front and the rear profiled boom 6, 7 takes place in each case in an identical manner by welding or/and with the aid of fastening elements in the form of rivets, screws or the like.

In addition, there is welded onto a rear side of the rear profiled boom 7 a collar weld nut 13 which is orientated coaxially to and in alignment with corresponding apertures (not illustrated) in the two profiled booms 6, 7 and in the U limbs 9, 10 of the central horizontal profile 8 and constitutes part of a towing attachment. A towing screw bolt is inserted from the front along the axis (indicated by dash-dotted lines) through the apertures into the collar weld nut 13 and screwed tightly therein.

Figure 3:
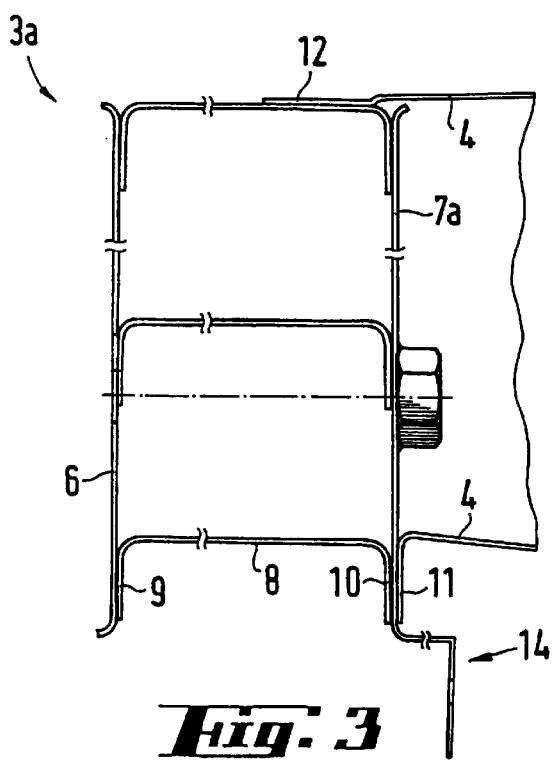
FIG. 3 shows, in an enlarged illustration, a longitudinal section through a further flexible member of a transverse-member module similar to FIG. 2, which is essentially of identical design and is additionally provided with a profiled strip for add-on parts.

The flexible member 3a according to FIG. 3 corresponds essentially to the flexible member 3 and the transverse-member module 2 according to FIGS. 1 and 2, and where components are identical the same reference numbers have also been used. The only difference in the flexible member 3a according to FIG. 3 is that the rear profiled boom 7a is extended downwards in the region of its lower edge by an angled profiled strip 14 which is provided with a grid of holes. In the exemplary embodiment illustrated, the profiled strip 14 constitutes an integral continuation of the curved web in the region of the lower edge of the profiled boom 7a. The profiled strip 14 serves for the fastening of add-on functional parts in the region of the flexible member 3a. Additional headlamps or else parts of functional devices located in the engine compartment, such as the heating and air-conditioning system or the like, may in particular be provided as the functional parts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Transverse-member module for a front- or rear-side end region of a motor vehicle, having a box-shaped flexible member from which protrude two deformation units which are spaced apart parallel to each other and are intended for connection to a respective longitudinal member of a body-supporting structure of the motor vehicle, wherein the flexible member is formed by two vertical profiles arranged spaced apart and parallel one behind the other in a longitudinal direction of the vehicle, and by at least two horizontal profiles which extend between the vertical profiles and are arranged spaced apart and parallel one above another in a vertical direction of the vehicle, the horizontal profiles being of structurally identical design.

2. Transverse-member module according to claim 1, wherein each horizontal profile has a U-shaped profile, the two U limbs each forming bearing flanges for the plane connection to the vertical profiles.

3. Transverse-member module according to claim 1, wherein the two vertical profiles are of structurally identical design.

4. Transverse-member module according to claim 2, wherein the two vertical profiles are of structurally identical design.

5. Transverse-member module according to claim 1, wherein a profiled strip provided with sockets for add-on parts is provided in a region of a lower edge of the vertical profile which is at the rear-based on a normal direction of travel.

6. Transverse-member module according to claim 2, wherein a profiled strip provided with sockets for add-on parts is provided in a region of a lower edge of the vertical profile which is at the rear-based on a normal direction of travel.

7. Transverse-member module according to claim 5, wherein the profiled strip is designed as an integral continuation of the vertical profile.

8. Transverse-member module according to claim 6, wherein the profiled strip is designed as an integral continuation of the vertical profile.

9. Transverse-member module according to claim 1, wherein the deformation units are designed as energy-absorbing sheet-metal structures which are connected rigidly to the flexible member.

10. Transverse-member module according to claim 2, wherein the deformation units are designed as energy-absorbing sheet-metal structures which are connected rigidly to the flexible member.

11. Transverse-member module according to claim 3, wherein the deformation units are designed as energy-absorbing sheet-metal structures which are connected rigidly to the flexible member.

12. Transverse-member module according to claim 5, wherein the deformation units are designed as energy-absorbing sheet-metal structures which are connected rigidly to the flexible member.

13. Transverse-member module according to claim 7, wherein the deformation units are designed as energy-absorbing sheet-metal structures which are connected rigidly to the flexible member.

14. Transverse-member module according to claim 8, wherein the deformation units are designed as energy-absorbing sheet-metal structures which are connected rigidly to the flexible member.

15. Transverse-member module according to claim 1, wherein a profiled strip provides with socket for add-on parts is provide in a region of a lower edge of the profile which is at a side of the box-shaped flexible member closest to the longitudinal member when in an assembled in use position.

16. Transverse-member module according to claim 15, wherein the profiled strip is designed as an integral continuation of the vertical profile.

17. Method of making a vehicle support frame transverse-member module which in use is supported by deformation units connected with end regions of longitudinal body support members, comprising;

spacing a pair of vertical sheet profiles in a vehicle support frame longitudinal direction, and connecting at least two identical horizontal sheet profiles to the vertical sheet profiles to thereby form a box-shaped transverse-member module.

18. Method according to claim 17, wherein each horizontal profile has a U-shaped profile, the two U limbs each forming bearing flanges for the plane connection to the vertical profiles.

19. Method according to claim 17, wherein the two vertical profiles are of structurally identical design.

20. Method according to claim 18, wherein the two vertical profiles are of structurally identical design.

21. Method according to claim 17, wherein a profiled strip provided with a socket for add-on parts is provided in a region of a lower edge of the verticle profile which is at a side of the box-shaped flexible member closest to the longitudinal member when in an assembled in use position.

22. Method according to claim 21, wherein the profiled strip is designed as an integral continuation of the vertical profile.

23. Method according to claim 17, wherein the deformation units are designed as energy-absorbing sheet-metal structures which are connected rigidly to the flexible member.

24. Method according to claim 17, comprising welding a threaded nut to one of the vertical sheet profiles said threaded nut in use forming parts of a vehicle towing assembly.

25. Method according to claim 17, wherein said sheet profiles are made of sheet metal, and wherein said connecting includes welding the profiles together.

26. Transverse-member module according to claim 1, wherein the two deformation units protrude externally from the box-shaped flexible member and wherein the two deformation units are disposed between the flexible member and the respective longitudinal member.

27. Transverse member module according to claim 26, wherein the two deformation units are connected to the box-shaped flexible member at a first end of the two deformation units and are connected to the respective longitudinal member at a second opposing end of the two deformation units.

28. Transverse-member module according to claim 1, wherein each of the two vertical profiles have webs that are curved outwards in a region of an upper edge of the two vertical profiles and in a region of a lower edge of the two vertical profiles.

29. Transverse-member module according to claim 2, wherein the U-shaped profile of each horizontal profile protrudes in a same direction.

30. Transverse-member module according to claim 27, wherein one of the two deformation units is connected to the box-shaped flexible member by a longitudinally extending upper connecting flange and the other of the two deformation units is connected to the box-shaped flexible member by a transversely extending lower connecting flange.

31. Transverse-member module according to claim 1, wherein the two deformation units are planar members.

* * * * *